United States Patent [19]

Hoshino et al.

[11] Patent Number: 4,719,486
[45] Date of Patent: Jan. 12, 1988

[54] FOCUS DETECTING APPARATUS FOR CAMERA

[75] Inventors: Kunihisa Hoshino, Urawa; Ken Utagawa, Kawasaki; Yosuke Kusaka, Yokohama; Shozo Yamano, Tokyo, all of Japan

[73] Assignee: Nippon Kogaku K. K., Tokyo, Japan

[21] Appl. No.: 809,408

[22] Filed: Dec. 16, 1985

[30] Foreign Application Priority Data

Dec. 20, 1984 [JP] Japan .................. 59-268776

[51] Int. Cl.⁴ .................. G03B 3/00; H04N 5/335
[52] U.S. Cl. .................. 354/408; 358/213.19
[58] Field of Search .................. 354/402–409; 358/213, 227, 213.13, 213.19, 213.24; 250/201 PF, 201, 204, 578

[56] References Cited

U.S. PATENT DOCUMENTS

| 4,329,577 | 7/1982 | Asano et al. .................. 250/201 |
| 4,410,258 | 8/1983 | Aoki et al. .................. 354/25 |
| 4,575,212 | 3/1986 | Kitaura et al. .................. 354/409 |

FOREIGN PATENT DOCUMENTS

0117512 7/1983 Japan .................. 358/227

*Primary Examiner*—W. B. Perkey
*Attorney, Agent, or Firm*—Shapiro and Shapiro

[57] ABSTRACT

A focus detecting apparatus for a camera has a charge storage type image sensor for controlling focusing on the basis of output from the image sensor. In the apparatus, object information having comparatively high correlation with focus detection precision is detected and charge storage time of a photoelectric conversion element is controlled in accordance with the detected object, whereby charge storage time is optimally controlled irrespective of object luminance distribution even if an object luminance level varies in a wide range, thereby performing high-speed, stable focus detection.

35 Claims, 24 Drawing Figures

PRIOR ART

FIG.1A

PRIOR ART

FIG.2A

PRIOR ART

FIG.1B

PRIOR ART

FIG.2B

PRIOR ART

FIG.1C

PRIOR ART

FIG.2C

PRIOR ART

FIG.1D

PRIOR ART

FOCUS DETECTING APPARATUS FOR CAMERA

BACKGROUND OF THE INVENTION

The present invention relates to a focus detecting apparatus for a camera and, more particularly to a focus detecting apparatus with a charge storage type image sensor to control focusing on the basis of an output from the image sensor.

A so-called TTL focus detecting apparatus using a focus detection scheme for detecting light rays passing through a photographing lens in a camera has an image sensor with photoelectric conversion elements aligned in an array. In to a contrast detection system, an optical image of an object which is focused on the image sensor is subjected to focus detection in accordance with acuity of the image. In to a defocusing detection system, two light components passing through two different regions of an exit pupil of a photographing lens are received by a pair of photoelectric conversion elements, and the focusing state is detected by a deviation between two images formed by the elements.

These focus detection systems utilize luminance distribution (object pattern) of the object. The photoelectric conversion part of either system comprises a charge storage type image sensor such as a CCD or MOS image sensor. A time serial signal from the sensor is arithemtically operated to perform focus detection.

As is well known, since the luminance level of the object varies in a wide range in a conventional focus detection apparatus for a camera, the charge storage time of the image sensor must be controlled in accordance with the luminance level of the object to provide a wider dynamic range of the image sensor.

In a conventional focus detection apparatus described in U.S. Pat. No. 4,410,258, an object luminance level monitor sensor is arranged near a focus detection sensor to control the charge storage time of the focus detection sensor in such a manner that an average value of the photoelectric conversion output from the focus detection sensor is set to be a predetermined value. In another conventional focus detection apparatus described in U.S. Pat. No. 4,329,577, a peak value of a time serial signal from a focus detection sensor is detected and discriminated to determine whether or not it exceeds a predetermined level. When the peak value exceeds the predetermined level, the charge storage time of the focus detection sensor is shortened. In the following description, the former type of apparatus is called an average type focus detection apparatus, and the latter type is called a peak type focus detection apparatus.

These conventional focus detection apparatuses have the following drawback. This will be described with reference of the object luminance distribution in FIGS. 1A to 1D and FIGS. 2A to 2D.

Figure 1A:
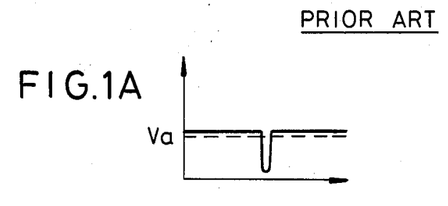
FIGS. 1A, 1B, 1C and 1D are respectively graphs showing photoelectric conversion outputs from a conventional average type focus detection apparatus.
Figure 1B:
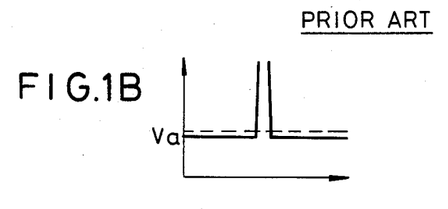
Figure 1C:
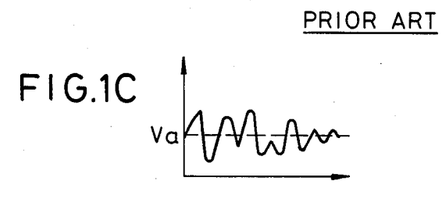
Figure 1D:
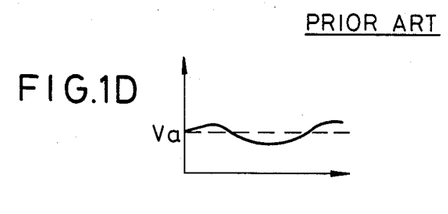
Figure 2A:
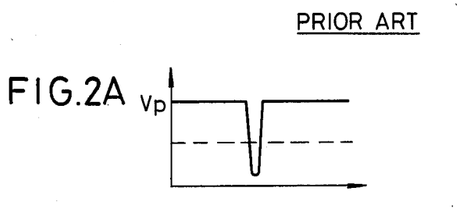
FIGS. 2A, 2B, 2C and 2D are respectively graphs showing photoelectric conversion outputs from a conventional peak type focus detection apparatus.
Figure 2B:
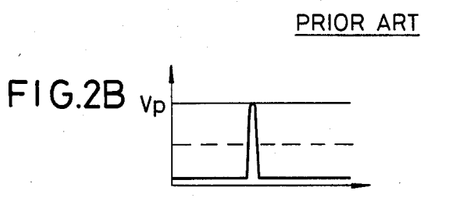
Figure 2C:
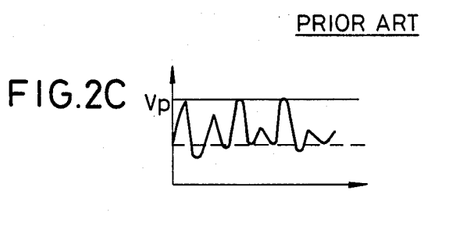
Figure 2D:
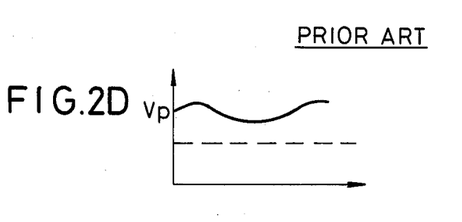

FIGS. 1A and 2A respectively show luminance distributions of outputs of the conventional average and peak type focus detection apparatuses, which correspond to a black stripe on a white background. FIGS. 1B and 2B show respectively luminance distributions of outputs of the conventional average and peak type focus detection apparatuses, which correspond to a white stripe on a black background. FIGS. 1C and 2C show respectively luminance distributions of high-frequency, high-contrast outputs from the average and peak type focus detection apparatuses. FIGS. 1D and 2D respectively show luminance distributions of low-frequency, low-contrast outputs of the average and peak type focus detection apparatuses. In each graph in FIGS. 1A to 1D and FIGS. 2A to 2D, the photoelectric conversion output is plotted along the ordinate, and the photoelectric conversion element array is plotted along the abscissa.

Referring to FIGS. 1A to 1D, the average value of the photoelectric conversion output in the average type focus detection apparatus is controlled to be a predetermined value Va. The charge storage time is excessively prolonged as shown in FIG. 1B. In this case, a photoelectric conversion output of the white background is excessively large and is not suitable for the input range of the subsequent processing circuit. In FIG. 1C, sufficient focus detection precision can be obtained due to the high-frequency, high-contrast object although the charge storage time is short. However, since the predetermined value Va is provided, the charge storage time is excessively prolonged. In FIG. 1D, the charge storage time should be prolonged for the low-frequency, low-contrast object but cannot be prolonged due to the predetermined value. As an example for the case in FIG. 1B, streets flooded with neon lights have a distinctive luminance distribution. However, since the background black level has a low illuminance, the charge storage time is prolonged, and dark current noise is increased, thereby degrading response time of the focus detection signal and focus detection precision. In order to eliminate these drawbacks, when the charge storage time is set to decrease the average level, noise (e.g., a quantization error of A/D conversion) of a focus detection arithmetic system is increased. As a result, the overall S/N ratio is decreased, and high focus detection precision cannot be obtained. It is therefore difficult to optimally set the average level.

In the peak type focus detection apparatus in FIGS. 2A to 2D, it is difficult to detect a peak value Vp within the charge storage time of the photoelectric conversion element, so that the peak value is detected after the photoelectric conversion output is read out. For example, in the luminance distribution (FIG. 1B) representing a saturated state of the object, i.e., an input exceeding the input range of the subsequent processing circuit, the charge storage time must be shortened and the photoelectric conversion output must be repeatedly read out until the state of FIG. 2B is obtained, i.e., until the peak value reaches the predetermined level Vp. The arithmetic operation must then be repeated a plurality of times until the peak value reaches the predetermined level. Therefore, the focus detection signal cannot be obtained at high speed. In particular, when the object has a low luminance level, i.e., when the charge storage time is prolonged, the focusing response time is greatly prolonged.

The conventional average and peak type focus detection apparatuses have the above drawbacks. Charge storage time is needlessly prolonged in accordance with a given object luminance distribution, thereby prolonging the focusing response time and degrading focu detection precision.

SUMMARY OF THE INVENTION

It is an object of the present invention to provide a focus detection apparatus for a camera wherein charge storage time can be optimally controlled irrespective of object luminance distribution even if an object luminance level varies in a wide range, thereby performing high-speed, stable focus detection.

In order to achieve the above object of the present invention, there is provided a focus detection apparatus wherein object information having a comparatively high correlation with focus detection precision is detected, and charge storage time of a photoelectric conversion element is controlled in accordance with the detected object.

DETAILED DESCRIPTION OF THE PREFERRED EMBODIMENTS

Figure 3:
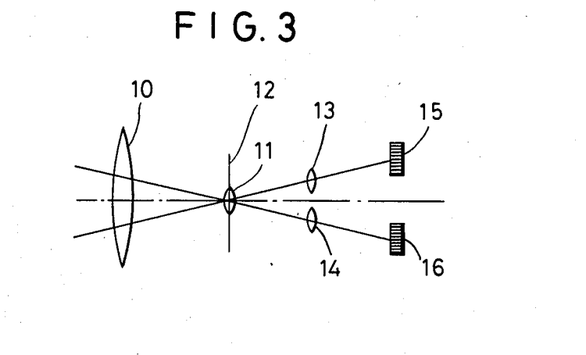
FIG. 3 is a schematic diagram of a focus detection optical system adapted in the present invention.

FIG. 3 is a schematic diagram of a focus detection optical system adapted in the present invention. A pair of object light rays passing through different regions of an exit pupil of a photographing lens 10 are focused on a field lens 11 located on a plane 12 equivalent to a film surface. The focused light becomes incident through refocusing lenses 13 and 14 on image sensors 15 and 16 which are arranged at positions conjugated with the plane 12 and each of which has N photoelectric conversion elements arranged in an array.

Referring to FIG. 3, when the photographing lens 10 is in the in-focus state, the images on the image sensors 15 and 16 coincide with each other. When the in-focus state is disturbed, the images on the image sensors 15 and 16 deviate from each other in accordance with the near- or far-focus state. The relative deviation between the images represents a focusing state of the photographing lens 10.

In the focus detection apparatus, the photographing lens is driven in accordance with the relative deviation. The image sensor stores charge while the photographing lens is being driven in accordance with the detected relative deviation. The focus detection apparatus then detects a new relative deviation in accordance with another output from each image sensor. The photographing lens is continuously driven by the sequential relative deviations until the in-focus stat is achieved.

The focus detection apparatus generates a relative deviation signal at intervals substantially corresponding to a total time of the charge storage time of the image sensor and the arithmetic operation time of the focus detecting part.

Figure 4:
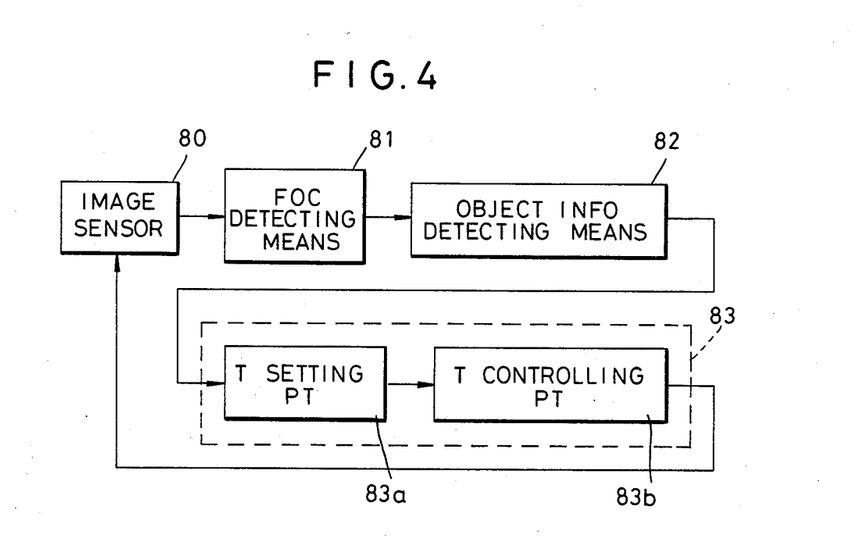
FIG. 4 is a block diagram of a focus detection apparatus according to a first embodiment of the present invention.
Figure 5:
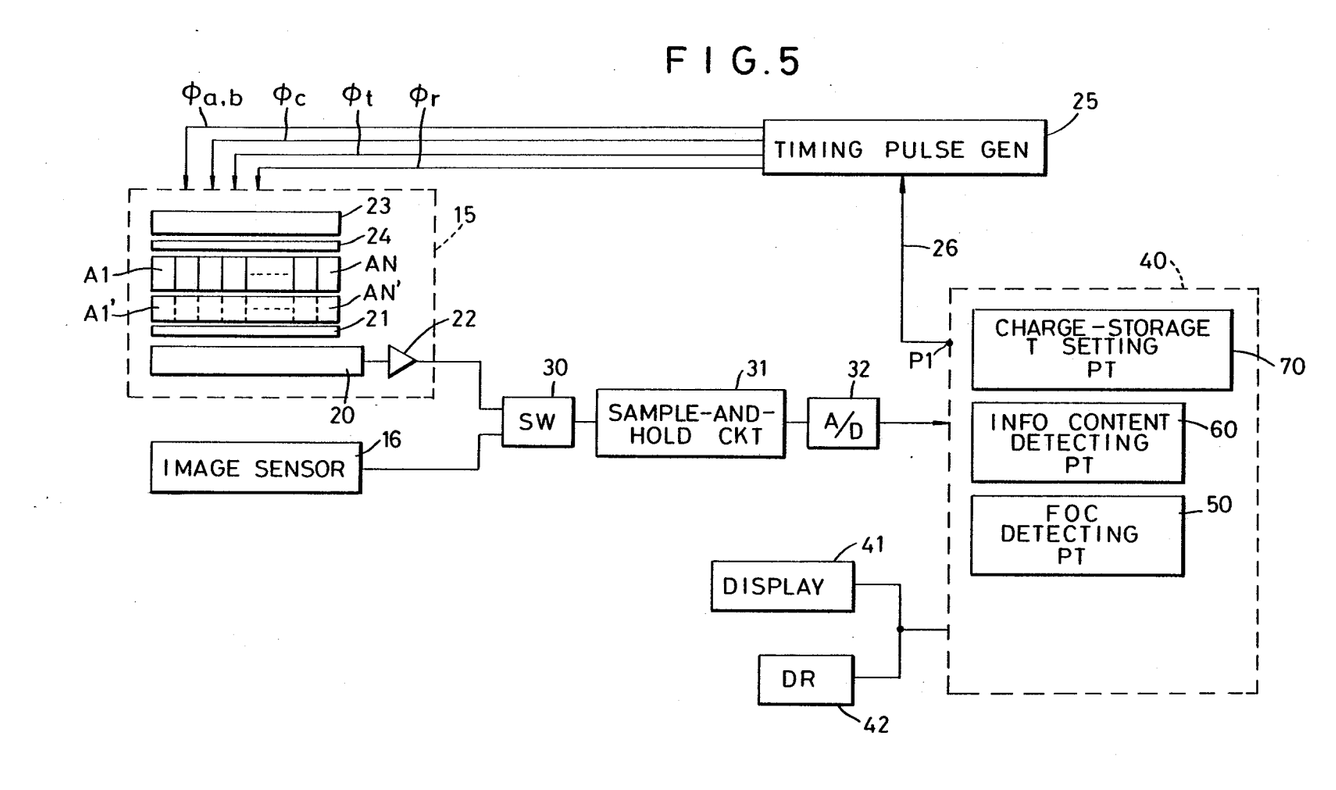
FIG. 5 is a detailed block diagram of the focus detection apparatus in FIG. 4.

An image sensor 80 in FIG. 4 corresponds to the image sensors 15 and 16 in FIGS. 3 and 5 and comprises a charge storage type image sensor such as a CCD or MOS image sensor. A focus detecting means 81 calculates the relative deviation between images on the image sensor 80. An object information detecting means 82 detects, as object information content I0, a parameter with a highest correlation with focus detection precision. A charge-storage time controlling means 83 comprises a charge-storage time setting part 83a for setting a charge storage time of photoelectric conversion elements in the image sensor 80 and a charge-storage time controlling part 83b for controlling the charge storage time of the photoelectric conversion elements.

Figure 8:
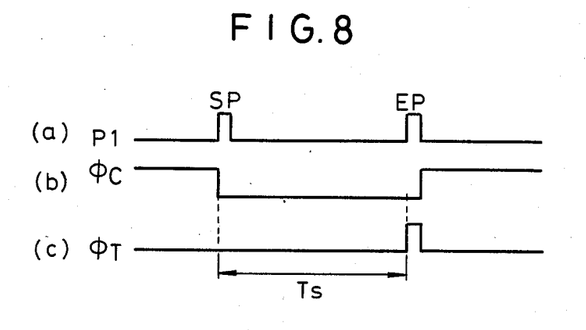
FIG. 8 is a flow chart for explaining a pulse oscillator in the focus detection apparatus shown in FIG. 4.

When a charge storage content of the previous focus detection is given as Ts(n), the charge-storage time setting part 83a sets a charge storage time Ts(n+1) of the next focus detection given by:

$$Ts(n+1) = (E0/I0) \cdot Ts(n) \quad (1)$$

where E0 is a constant representing a possible object information content threshold value for obtaining high focus detection precision. The constant E0 will be described in detail later. The charge-storage time controlling part 83b controls opening/closing of each gate of the image sensor such that an exposure time of each photoelectric conversion element in the image sensor is set to be the value set by the charge-storage time setting part 83a, in accordance with the timing chart of FIG. 8.

FIG. 5 shows a detailed arrangement of the focus detection apparatus in FIG. 4. The focus detection apparatus incorporates a microcompute 40 (to be referred to as an MC hereinafter). The image sensor 15 comprises small photoelectric conversion elements A1 to AN aligned in line at pitch a P0, charge storage parts A1' to AN', a transfer register 20 for transferring the stored charge as time-serial photoelectric conversion outputs a1 to aN, a transfer gate 21 for controlling transfer of charge to the transfer register 20, an output amplifier 22 for performing charge voltage conversion, an overflow drain 23 for discharging an unnecessary charge, and a clear gate 24 for controlling the flow of charge to the overflow drain 23. The image sensor 16 has the same arrangement as that of the image sensor 15, and a detailed arrangement of the sensor 16 is omitted. A timing pulse generator 25 generates a clear pulse $\phi c$ for enabling/disabling the clear gate 24, a transfer pulse $\phi t$ for enabling/disabling the transfer gate 21, two phase transfer clock pulses $\phi a$ and $\phi b$, and a reset pulse $\phi r$ for resetting the output amplifier 22. The same pulses (not shown in FIG. 5) as described above are also supplied to the image sensor 16.

The time serial outputs a1 to aN and time serial output b1 to bN respectively generated by the image sensors 15 and 16 are sequentially switched by a switching circuit 30 in an order of a1, b1, a2, b2, ... aN and bN. The reordered output is supplied to an A/D converter 32 through a sample-and-hold circuit 31. A digital signal from the A/D converter 32 is transferred to and stored in an internal memory of the MC 40. The MC 40 comprises a focus detecting part 50, an information content detecting part 60 and a charge-storage time setting part 70. The focus state detected by the focus detecting part 50 is supplied to a display 41 and a photographing lens driver 42. A storage charge start/end pulse for photoelectric conversion elements is supplied from a terminal P1 of the MC 40 to the timing pulse generator 25 through a line 26. The focus detecting part 50 corresponds to the focus detecting means 81 in FIG. 4, the information content detecting part 60 corresponds to an object information detecting means 82 in FIG. 4, and the charge-storage time setting part 70, the line 26 and the timing pulse generator 25 correspond to the charge-storage time controlling means 83 in FIG. 4.

The focus detecting part 50 in the MC 40 calculates correlation coefficients between the data a1, ..., ai, ... aN from the image sensor 15 and the data b1, ..., bj, ... bN from the image sensor 16 by shifting predetermined data of the data from the image sensor 15 by L with respect to the data from the image sensor 16. More specifically, correlation coefficients $C(L)$ are calculated as follows:

$$C(L) = \sum_{i=g}^{r} |a_i - b_j| \qquad (2)$$

for $L = j - i$ where L is an integer corresponding to a shift of the data string, as described above. The initial term g and the last term r can be changed on the basis of the shift L.

When shifts obtained by decrementing and incrementing the current shift L are given as $L-1$ and $L+1$, and correlation coefficients of these shifts $L-1$, L and $L+1$ are given as follows:

$$C(L-1) = C_{-1}$$

$$C(L) = C_0$$

$$C(L+1) = C_{+1}$$

Focus control must be performed in accordance with the shift L of the correlation coefficient $C_0$ satisfying the following inequalities:

$$C_{-1} \geq C_0 \text{ and } C_{+1} \geq C_0 \qquad (3)$$

Figures 6A, 6B, 6C, 7:
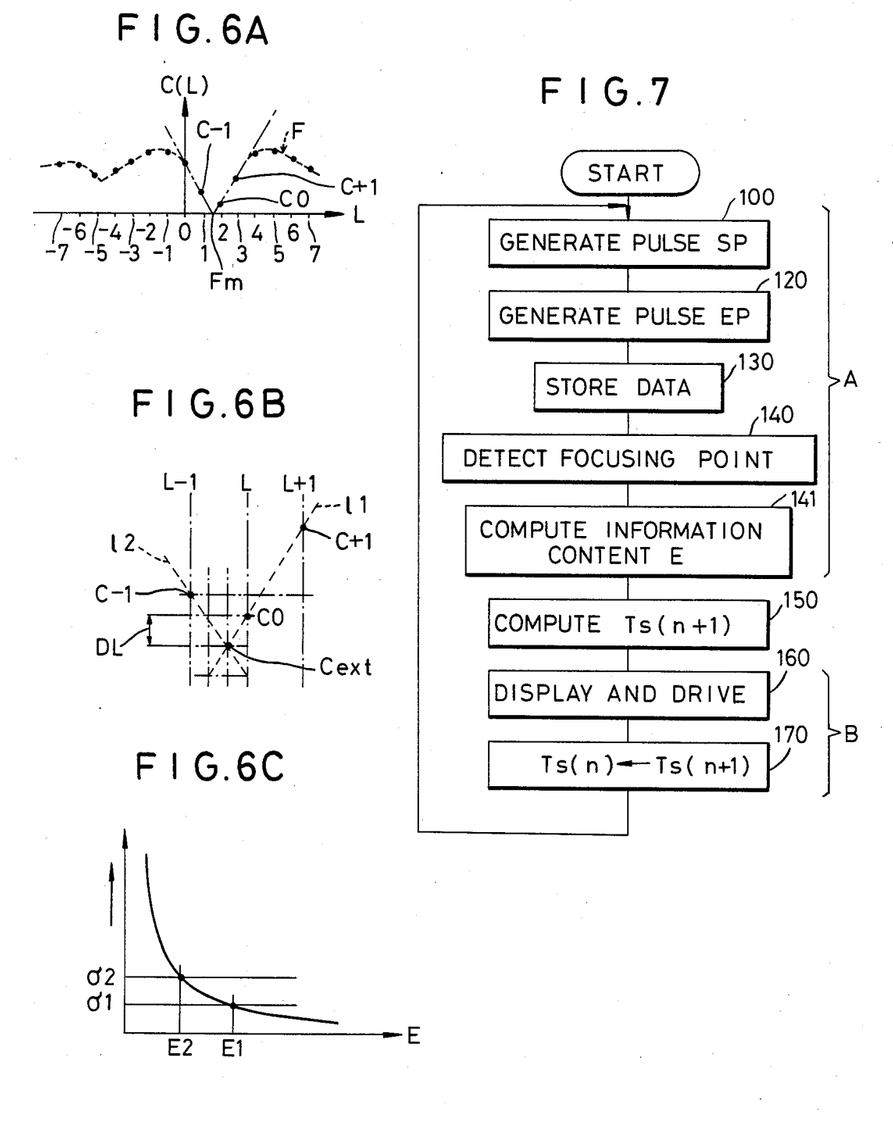
FIG. 6A is a graph showing a correlation function curve obtained by a correlation coefficient interpolation scheme.
FIG. 6B is a diagram for explaining the correlation coefficient interpolation scheme.
FIG. 6C is a graph showing the relationship between the image surface deviation dispersion and object information content.
FIG. 7 is a flow chart for explaining the operation of the focus detection apparatus shown in FIG. 4.

More specifically, the discrete correlation coefficients $C(L)$ are plotted and interpolated to derive a correlation function F, as shown in FIG. 6A. The MC 40 checks using the correlation function whether or not an extremum is present between the coefficients $C_{-1}$ and $C_{+1}$ in inequalities (3). If inequalities (3) are satisfied, the extremum can be present between the coefficients $C_{-1}$ and $C_{+1}$. In order to obtain a focusing position, therefore, a shift giving the extremum is calculated. For example, even in a case of FIG. 6A wherein at least two extrema are present, the shift representing the in-focus state must provide the extremum with a maximum correlation coefficient Fm.

An extremum $C_{ext}$ can be derived using the correlation coefficients $C_{-1}$, $C_0$ and $C_{+1}$ in the following manner. As shown in FIG. 6B, correlation coefficient interpolation is performed. Since condition $C_0 < C_{-1} < C_{+1}$ is established, a line l1 is drawn to connect the maximum value $C_{+1}$ and the value $C_0$ among three correlation coefficients. A line l2 with the same slope as that of the line l1 but a sign opposite thereto is drawn to connect the correlation coefficient $C_{-1}$ and the correlation coefficient $C_0$. The intersection of the lines l1 and l2 is given as the extremum $C_{ext}$ of the correlation function F. Therefore, when a distance between the coefficient $C_0$ and the extremum $C_{ext}$ along a coordinate axis $C(L)$ is represented by $D_L$, it is given by:

$$D_L = 0.5 \times (C_{-1} - C_{+1}) \qquad (4)$$

Therefore, the extremum $C_{ext}$ of the correlation function F is derived as follows:

$$C_{ext} = C_0 - |D_L| \qquad (6)$$

A minimum value $C_{min}$ among a plurality of extrema $C_{ext}$ corresponds to the maximum correlation coefficient Fm. The shift Lm corresponding to the maximum correction coefficient Fm is calculated by:

$$Lm = L + D_L/E$$

$$E = MAX(C_{-1} - C_0, C_{+1} - C_0) \qquad (7)$$

wherein E represents the larger one of $C_{-1} - C_0$ and $C_{+1} - C_0$.

When the photographing lens is in the in-focus state, the shift Lm is converted to an image deviation Zd, along the focusing surface, given by:

$$Zd = K \cdot Lm$$

where K is the conversion constant.

The focusing state of the photographing lens is displayed on the display 41 in accordance with the deviation Zd. At the same time, the photographing lens driver 42 is driven by the deviation Zd, thereby automatically obtaining the in-focus state.

In this case, the information content detecting part 60 calculates as the object information content I0 a maximum value of the absolute value of the difference between the correlation coefficients $C(L)$:

$$I0 = MAX|C(L) - C(L-1)| \qquad (8)$$

wherein the shift L is an integer. When the correlation function F provides the minimum value $C_{min}$, as shown in FIG. 6A, equation (8) is rewritten as:

$$I0 = MAX(C_{-1} - C_0, C_{+1} - C_0)$$

The value is the same as E in equation (7) used in the focus detection arithmetic operation.

In general, focus detection precision Ac is given as:

$$Ac' \Delta Fs/(\Delta x \cdot N) \qquad (9)$$

where $\Delta x$ is a displacement of the image on the photoelectric conversion element surface of the image sensor, $\Delta Fs$ is a change in focus detection signal, and N is an error component mixed in the focus detection system. The larger the value of precision Ac is, the higher th detection resolution is. The displacement Δx corresponds to L−(L−1)=1, and differences (C(L)−C(L−1)) between the correction coefficients of the correlation function F are proportional to the change ΔFs in the focus detection signal. When the error component N is predetermined, the differences are proportional to the precision Ac in proportional expression (9). Therefore, since the object information content I0 is represented by equation (8), the focus detection precision Ac in proportional expression (9) is closely related to object information content E. Therefore, it is readily understood that the object information content E is closely associated with the focus detection precision.

FIG. 6C shows experimental results showing the relationship between the dispersion of the deviations Zd and the object information content E when the photographing lens is set in the in-focus state. When a noise component is not present in the focus detection system, the focus detection arithmetic part has zero deviation Zd. However, since noise is inevitably generated, deviations vary. The relationship between the dispersion δ and the object information content E is given as follows:

$$E \cdot \delta \approx const$$

if E is increased, δ is decreased.

The larger the content E is, the smaller the dispersion δ is and the higher the precision of focu detection. For this reason, it is understood that the charge storage time of the image sensor can be controlled using the object information content E.

The control operation of the image sensor charge storage time by using the object information content E will be described hereinafter.

In step 100 in FIG. 7, a start pulse SP is supplied from the MC 40 to the timing pulse generator 25 through the line 26, and the photoelectric conversion elements A1 to AN and B1 to BN start storing charges. A timer means in the MC 40 is started. As shown in FIG. 8, in synchronism with the start pulse SP from the line 26, the timing pulse generator 25 sets the clear pulse φc at low level (referred to as an L level hereinafter) to disable the clear gate 24. Th exposure operation of the photoelectric conversion elements is started. When the previous charge storage time Ts(n) preset in the MC 40 is completely counted by the timer means in step 120, an end pulse EP is supplied to the timing pulse generator 25. In synchronism with the end pulse EP via the line 26, the timing pulse generator 25 supplies the transfer gate pulse φt (high level signal) shown in FIG. 8C to the transfer gate 21. The stored charges are then transferred to the transfer register 20 through the transfer gate 21, thereby completing the exposure operation of the photoelectric conversion elements. Charge storage of the photoelectric conversion elements A1 to AN and B1 to BN is completed, and the photoelectric conversion outputs a1 to aN and b1 to bN are A/D converted and stored as charge data in the memory means in the MC 40 in step 130.

In step 140, the focus detecting means 81 detects the deviation (i.e., the focusing point) in accordance with the photoelectric conversion outputs stored in step 130 and converts the deviation to the displacement of the photographing lens. In step 141, the information content detecting means 60 in the MC 40 calculates the object information content I0, i.e., E in this embodiment so as to set the next charge storage time of the image sensors.

In step 150, the charge-storage time controlling means 83 in the MC 40 calculates the next charge storage time Ts(n+1) of the image sensors. More specifically, the next equation is used:

$$Ts(n+1)=(E0/E) \cdot Ts(n)$$

Let E0 be E1 corresponding to δ1 with small dispersion in FIG. 6C, and Ts(n+1) is calculated. The object information content E1 is the object information content corresponding to a small dispersion δ in deviations Zd derived from focus detection precision. The object information content E1 is given as, for example, about 200. In this case, condition $\delta 1 \leq 25$ μm is given. Therefore, when the object information content E is sufficiently larger than the object information content E1, the next charge storage time Ts(n+1) is shorter than the previous charge storage time Ts(n), as is apparent from the above equation. However, when the object information content E is smaller than the object information content E1, the next photoelectric convertion time Ts(n+1) is longer than the previous photoelectric conversion time Ts(n) in accordance with the equation described above. Therefore, the focus detection apparatus can decrease the next charge storage time while focus detection precision is kept high when the object information content E is sufficiently larger than E1, thereby improving focus detection response characteristics. However, when the object information content E is smaller than E1, the next charge storage time can be increased, and focus detection precision is accordingly improved.

In step 160, the photographing lens is driven and focus detection information is displayed on the basis of the deviations detected in step 140. In step 170, a count time is set in the timer means in the MC 40, and time Ts(n) is updated to time Ts(n+1), so that the storage (memory) means stores the time Ts(n+1) as the time Ts(n). The flow returns to step 100 to calculate the next charge storage time of the image sensors. The exposure of the image sensors is controlled by the next charge storage time Ts(n+1) calculated in step 150. The above operations are repeated until the in-focus state is established.

The calculation of the charge storage time Ts(n+1) is not limited to equation (1) but can be replaced with equation (1) ' as follows:

$$Ts(n+1)=Ts(n) \cdot E0/(E+K1) \tag{1}'$$

where K1 is the constant which is ⅓ of E0. When equation (1)' is used, the next charge storage time Ts(n+1) is not dispersed even if the object information content E is very small, thereby increasing unnecessary charge storage time.

A second embodiment of the present invention will be described with reference to FIG. 9. The arrangement of the second embodiment is substantially the same as that of the first embodiment, except for the functions of an MC 40. Only the functions of the MC 40 will therefore be described.

Figure 9:
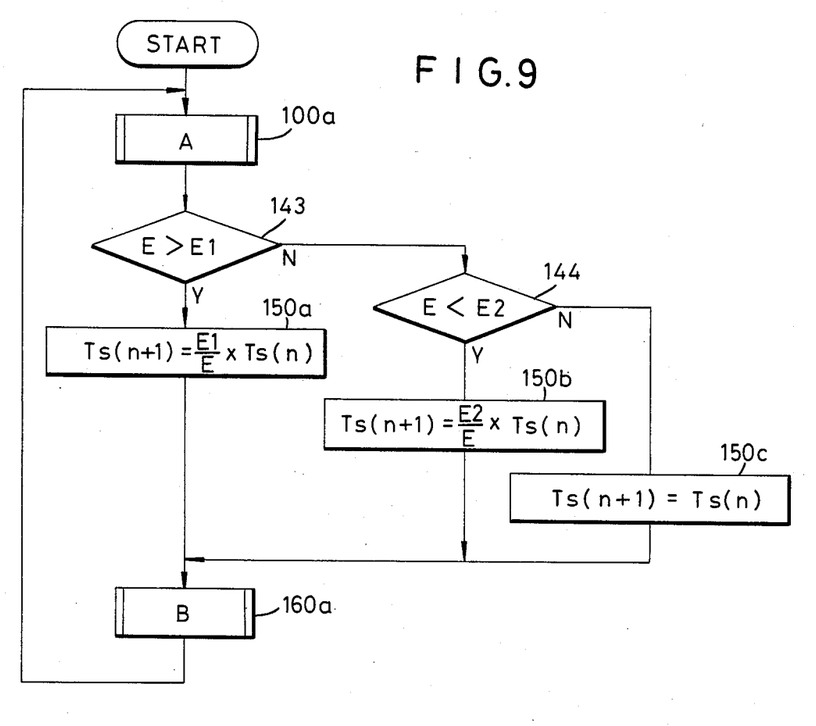
FIG. 9 is a flow chart for explaining the operation of a focus detection apparatus according to a second embodiment of the present invention.

Referring to FIG. 9, step 100a represented by reference symbol A corresponds to steps 100 to 141 in FIG.

7, and step 160a represented by reference symbol B corresponds to steps 160 and 170 in FIG. 7.

The MC 40 checks in step 143 whether or not the object information content E calculated in step 140 exceeds a predetermined first information content E1 (e.g., E1 is about 200). If YES in step 143, the same charge storage time control (to be referred to as a first charge-storage time control scheme hereinafter) as in the first embodiment is performed, so that the next charge storage time Ts(n+1) is calculated to be shorter than the previous charge storage time Ts(n), thereby providing high-response detection.

However, if NO in step 143, the MC 40 checks in step 144 whether or not the object information content E is less than a value guaranteeing focus detection precision, i.e., the object information content E2. If YES in step 144, the dispersion δ2 is large, and the object information content of interest cannot provide high focus detection precision. In this case, the charge storage time must be prolonged in step 150b in accordance with the following equation representing a second charge-storage time control scheme:

$$Ts(n+1) = Ts(n) \cdot E2/E$$

When the object information content E satisfies condition E2<E<E1, the charge storage time is not changed in step 150c, and the next charge storage time Ts(n+1) is set to be the same as the previous charge storage time Ts(n).

The second embodiment employs both the first and second charge-storage time control schemes. When the object information content is sufficiently large, the charge storage time is shortened to improve the response time in focus detection. However, when the object information content is small, the charge storage time is prolonged to improve focus detection precision.

The control scheme may be selected by an external switch (not shown) as needed. In a focus detection apparatus in which good focus detection response has a priority, condition E2=0 is given in step 150b, and only the first charge-storage time control scheme is performed. However, in a focus detection apparatus in which high focus detection precision has a priority, the E1 value is set to be an infinite value, and only the second charge-storage time control scheme is performed.

A third embodiment of the present invention will be described with reference to FIG. 10. In the above embodiment, when the object luminance is very low, a dark current noise component is increased since the charge storage time is greatly prolonged. In other words, focus detection precision may not be improved by only the second charge-storage time control system. In addition, when a large number of focus detection system noise components are mixed in the first charge-storage time control system, it is desirable that the object information content E be effectively utilized to improve focus detection precision. The third embodiment to be described below implements this feature.

Figure 10:
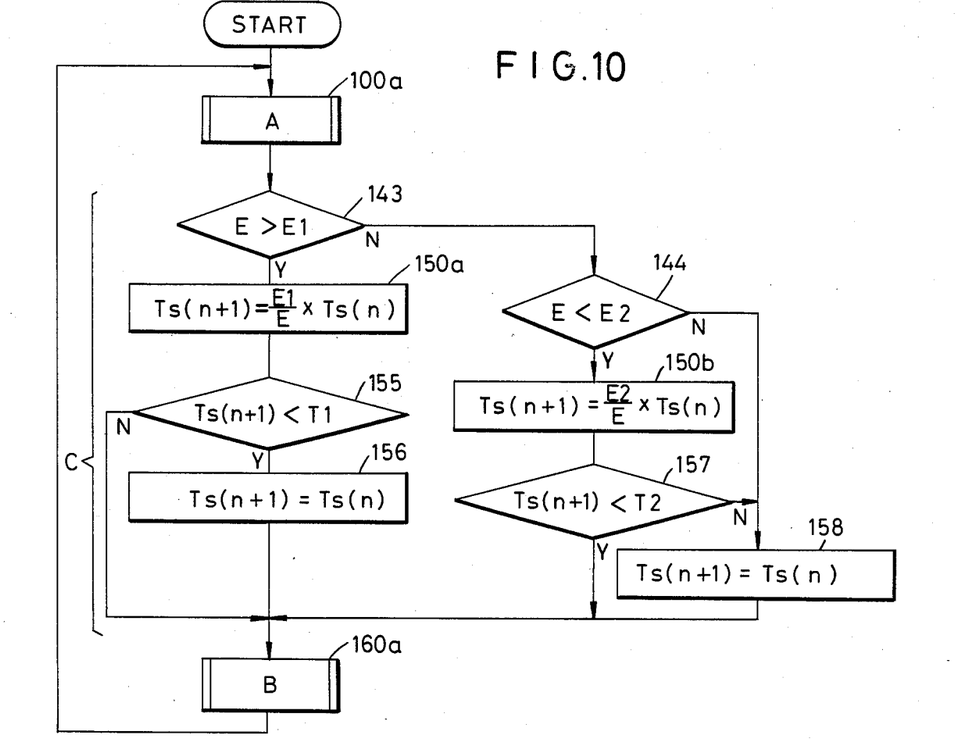
FIG. 10 is a flow chart for explaining the operation of a focus detection apparatus according to a third embodiment of the present invention.

Referring to the flow chart of FIG. 10, in steps 143 to 150b, an object information content E is detected and is compared with preset threshold values E1 and E2. In the same manner as in the second embodiment, one of the first and second charge-storage time control schemes is used to perform control.

The MC 40 checks in step 155 whether or not the next charge storage time Ts(n+1) calculated under the control of the first charge-storag time control scheme is longer than the predetermined time T1 (e.g., about 10 ms). If YES in step 155, the next charge storage time Ts(n+1) is used. However, if NO in step 155, the next charge storage time Ts(n+1) is short. In this case, when a large number of focus detection system noise components are mixed, the noise components may adversely affect focus detection precision. Thus, the next charge storage time Ts(n+1) is set to be equal to the previous charge storage time Ts(n) in step 156 without performing focus detection control by the next charge storage time Ts(n+1). The flow advances to step 160a, and focus detection control is performed.

Similarly, in steps from step 144 which corresponds to the second charge-storage time control scheme, the MC 40 checks in step 157 whether or not the next charge storage time Ts(n+1) is shorter than a predetermined time T2 (e.g., about 100 to 200 ms). The predetermined time T2 can vary in accordance with changes in temperature. If YES in step 157, the charge storage time Ts(n+1) calculated by the second charge-storage time control scheme in step 150b is used. In this manner, the charge storage time is prolonged to improve focus detection precision. However, if NO in step 157, desired focus detection precision cannot be expected due to an increase in dark current in accordance with an increase in charge storage time. Therefore the next charge storage time Ts(n+1) is set to be equal to the previous charge storage time Ts(n) in order that degradation of focus detection response is prevented.

In the above embodiment, when the second charge-storage time control scheme is continuously used while the object information content is very small, the output from the image sensor may fall outside the input range of the subsequent processing circuit. When the illuminance distribution or the illuminance level is abruptly changed during charge storage or immediately prior to charge storage, the exposure of the photoelectric conversion elements based on the preset charge storage time deviates from an optimal exposure, i.e., subjected to an underexposure or overexposure. When the illuminance level is increased, the photoelectric conversion outputs a1 to aN and b1 to bN are abruptly increased due to the overexposure and may fall outside the input range of A/D conversion. In this case, focus detection precision is greatly degraded. In order to eliminate this drawback, a fourth embodiment is proposed.

Figure 11:
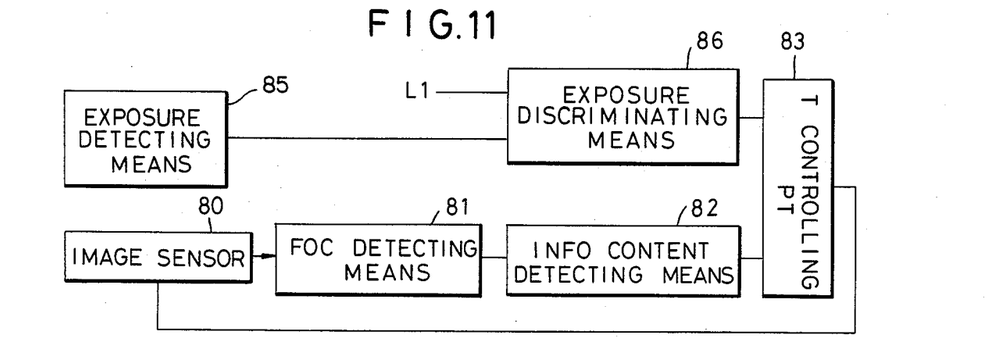
FIG. 11 is a block diagram of a focus detection apparatus according to a fourth embodiment of the present invention.

The fourth embodiment will be described with reference to FIGS. 11 to 13. FIG. 11 is a block diagram showing a focus detection apparatus which has the image sensor 80 of FIG. 4, an exposure detecting means 85 for detecting an exposure of an object, and an exposure discriminating means 86 for discriminating whether or not the exposure detected by the exposure detecting means 85 exceeds a threshold value L1 preset in the focus detection apparatus.

Referring to FIG. 11, the threshold value L1 is an exposure which is about ⅔ to 4/5 of a maximum value Vmax of the input range of an A/D converter. The exposure discriminating means 86 controls to interrupt charge storage of the photoelectric conversion elements when the exposure detected by the exposure detecting means exceeds the threshold value L1.

Figure 12:
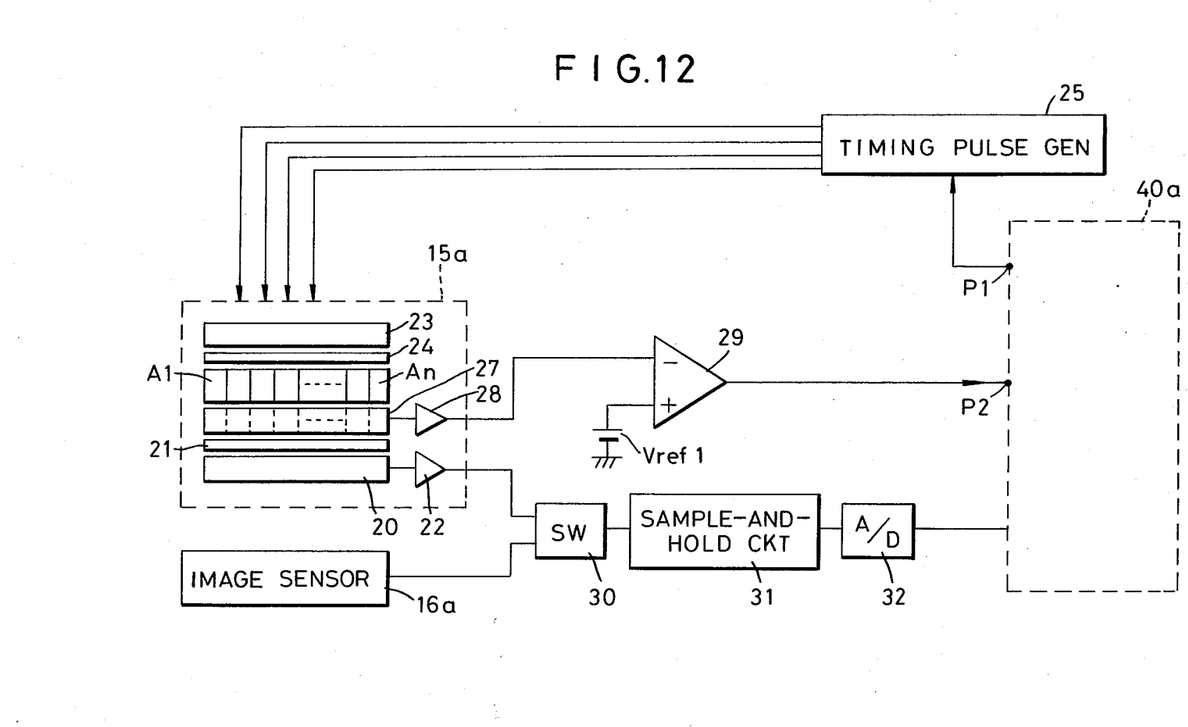
FIG. 12 is a detailed block diagram of the focus detection apparatus shown in FIG. 11.

FIG. 12 shows a detailed arrangement of the focus detection apparatus in FIG. 11. An MC 40a is incorporated in the focus detection apparatus in FIG. 11. Storage electrodes 27 of an image sensor 15a are respectively arranged above charge storage parts A1' to AN'. An amplifier 28 connected to the storage electrodes 27 serves to detect a potential at the electrodes 27. It should be noted that an image sensor 16a has the same arrangement as that of the image sensor 15a, and a detailed arrangement thereof is omitted. An amplifier output is supplied to the inverting input terminal of a comparator 29. A proper bias voltage Vref (threshold value L1) is supplied to the noninverting input terminal of the comparator 29. The exposure detecting means 85 comprises the storage electrodes 27 and the amplifier 28. The exposure discriminating means 86 comprises the comparator 29. An output from the comparator 29 is supplied to a terminal P2 of MC 40a. The terminal P2 serves as an external interrupt terminal of a leading edge detecting type. An output from the amplifier 28 is a voltage which is gradually decreased proportionally to a total charge (i.e., a total charge after photoelectric conversion) detected by the charge electrodes 27 upon starting of charge storage. When the voltage from the amplifier 28 reaches the threshold value Vref, an output from the comparator 29 goes high. The subsequent operation will be described hereinafter.

Figure 13A:
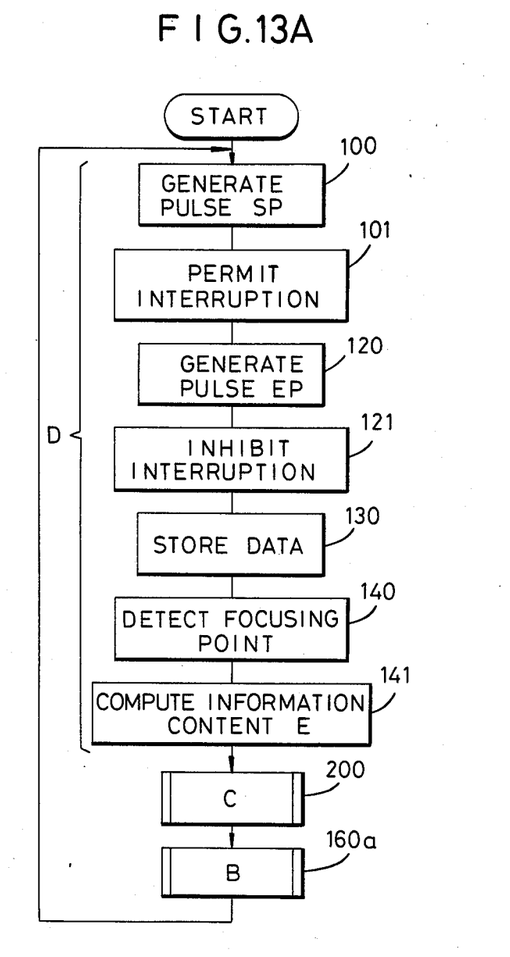
FIGS. 13A and 13B are flow charts for explaining the operation of the focus detection apparatus in FIG. 11.
Figure 13B:
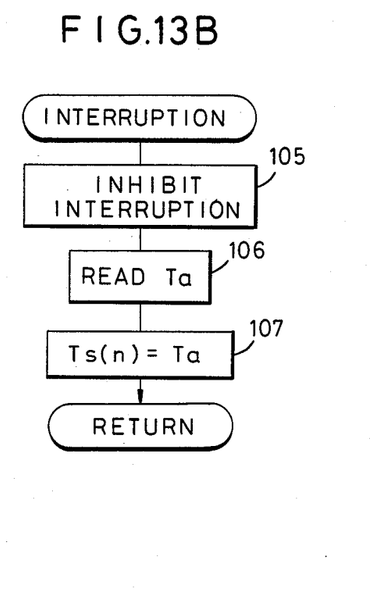

The operation of the focus detection apparatus will be described with reference to FIGS. 13A and 13B. In the same manner as in the first embodiment, the MC 40a supplies a start pulse to a timing pulse generator 25 in step 100, so that the photoelectric conversion elements in the image sensors 15a and 16b start charge storage.

In step 101 an interruption is permitted. When the output from the charge-storage potential detection amplifier 28 as the exposure detecting means 85 reaches the threshold value L1 (Vref), the comparator 29 is inverted, and the terminal P2 of the MC 40a goes high. Thus, the interruption service routine is executed. This status indicates that the object luminance is abruptly changed or the object information content is small and an output may fall outside the input range of the subsequent processing circuit if the previous charge storage time Ts(n) determined by the second charge-storage time control scheme is used. When the interruption service routine is started, an interruption inhibit instruction is fetched in step 105. When the exposure of the photoelectric conversion elements reaches the threshold value L1, a timer output Ta from a timer means in the MC 40a is fetched in step 106. In step 107, the data Ts(n) written in the memory means in the MC 40a is updated to the time Ta obtained in step 106 since the preset charge storage time is not suitable for calculation of the next charge storage time. When the operation in step 107 is completed, the flow returns to step 120 in the main routine in FIG. 13A. In step 120, the MC 40a supplies an end pulse to the timing pulse generator 25 to complete charge storage of the photoelectric conversion elements. In step 121, the interruption inhibit instruction is received in step 121. The operations after step 130 are the same as those in the third embodiment, and the next charge storage time is calculated on the basis of the time Ta. Step 200 corresponds to step 143, 144, 150a, 150b, 155, 156 and 157.

According to the fourth embodiment, the individual outputs of the photoelectric conversion elements aligned in the array may sometimes fall outside the image range of the A/D converter even if the average value of the photoelectric conversion outputs falls within the input range. When an object has a small object information content, focus detection precision is impaired. When some input components fall outside the input range, the corresponding outputs from the A/D converter have an identical level, so that the A/D converted output represents a luminance distribution different from that of the object. As a result, an accurate object information content cannot be obtained. An improvement is made in consideration of the above situation, thereby providing a fifth embodiment.

The fifth embodiment of the present invention will be described with reference to FIGS. 14A and 14B.

Referring again to FIG. 13A, charge storage of the photoelectric conversion elements is started in step 100. In step 101, the interruption is permitted. Steps 100, 101, 120, 121, 130, 140 and 141 in FIG. 13A correspond to step 300 indicated by D in FIG. 14A. When the illuminance level of the object does not exceed the threshold value L2 smaller than the threshold value L1, charge storage of the image sensors is performed for the preset charge storage time Ts(n). Its charge storage is completed in step 120. The flow advances to step 142 through steps 121, 130, 140 and 141. It should be noted that the bias voltage applied to the noninverting input terminal of the comparator 29 corresponds to the threshold value L2 in the fifth embodiment. The MC checks in step 142a and 142b whether or not the photoelectric conversion outputs a1 to aN and b1 to bN fall within the input range of an A/D converter 32. In this case, when even one of the photoelectric conversion outputs a1 to aN and b1 to bN takes an upper limit of the input range of the A/D converter 32, the flow advances to step 158b. The threshold value L2 is determined such that individual outputs from the photoelectric conversion elements fall within the input range of the A/D converter when the illuminance on the surface of the photoelectric conversion element array does not exceed the threshold value L2. For example, the threshold value L2 is set to be about $\frac{1}{3}$ to $\frac{1}{2}$ of the threshold value L1. When the output of even one of the photoelectric conversion elements falls outside the input range of the A/D converter 32, the flow advances to step 158b. A flag AVFLG for determining the operation of the interruption service routine in FIG. 14B is then set to be "1" conversion outputs fall within the input range of the converter 32, the flow advances from step 142b to step 143 (FIG. 10). When the object information content E is smaller than the predetermined value E1 in step 143, the flow advances to step 144. The content E is further compared with the predetermined value E2 in the same manner as in the fourth embodiment, and the flow advances to the next step 150b or step 156.

A case will be described wherein the exposure discriminating means 86 detects that the illuminance level of the object exceeds the threshold value L2. In this case, the interruption service routine in FIG. 14B is executed.

Figure 14A:
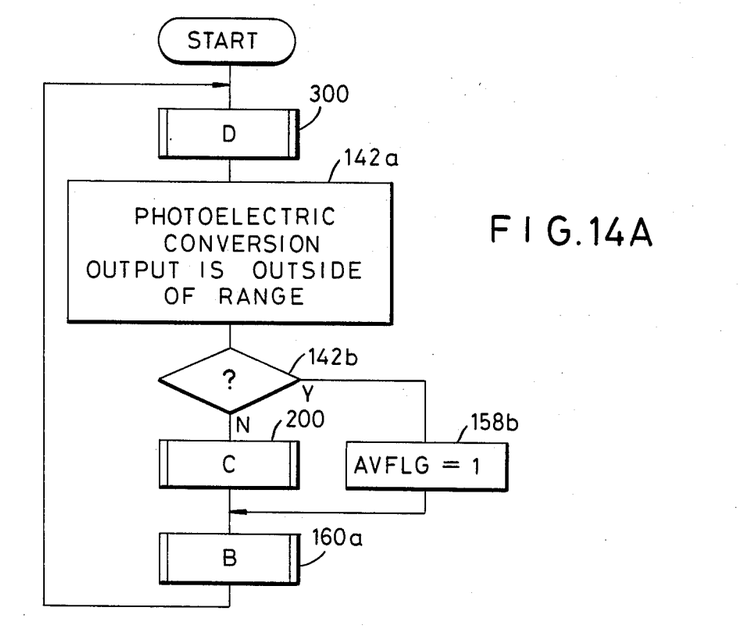
FIGS. 14A and 14B are flow charts for explaining a focus detection apparatus according to a fifth embodiment of the present invention.
Figure 14B:
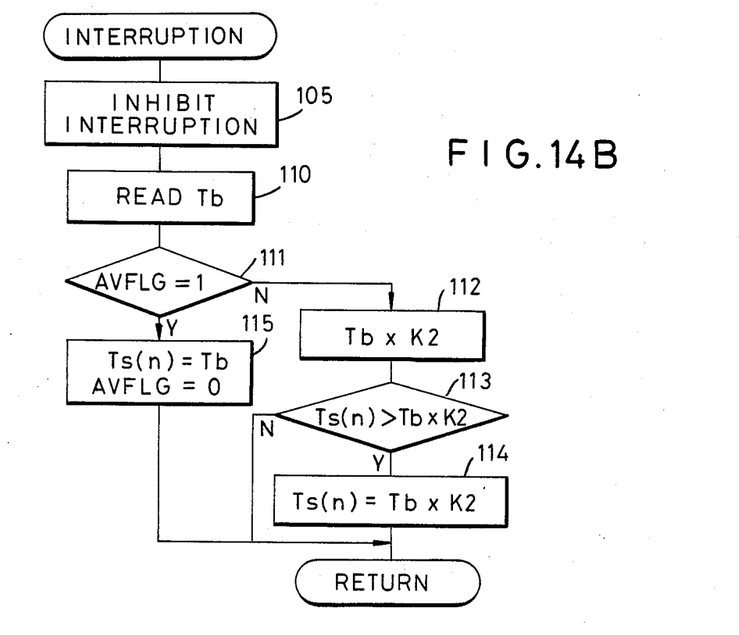

The interruption service routine in FIG. 14 is executed. In this routine, the interruption is inhibited in step 105 in the same manner as described above. A timer output is read in step 110, and is given as Tb. When the MC determines in step 111 that condition AVFLG=1 is not established, it indicates that the focus detection apparatus has performed focus detection control for the optimal charge storage time, and that the interruption service routine has been performed. In step 112, a calculation (Tb×K2) is performed. The coefficient K2 is given by L1/L2, which is about 2 to 3. In step 113, the time Ts(n) stored in the memory means in the MC 40a is compared with the time (Tb×K2). If Ts(n)≧Tb×K2 is established, the data Ts(n) in the memory means in the MC 40a is updated to the time (Tb×K2) because the time Ts(n) causes the exposure of the photoelectric conversion element surface to exceed the threshold value L1 in the fourth embodiment. Therefore, the exposure of the photoelectric conversion element surface is set not to exceed the upper threshold value L1 in steps 113 and 114. The subroutine is ended and step 120 in the main routine in FIG. 14A (see FIG. 13A) is performed. However, when condition Ts(n)<Tb×K2 is established, the charge storage time Ts(n) is not updated, and the flow returns to step 120.

When flag AVFLG=1 is established in step 111, i.e., the MC 40a determines that the photoelectric conversion output exceeds the upper limit Vmax of the input range of the A/D converter for the previous charge storage time, the charge storage time Ts(n) is updated to the time Tb (step 110) set in step 115, i.e., condition AVFLG=0 is established, and the flow returns to step 120 of the main routine. In this case, the photoelectric conversion element surface is controlled by the exposure determined by the threshold value L2, and the individual photoelectric conversion outputs fall within the input range of the A/D converter.

Even if condition AVFLG=1 is eatablished for an object with a comparatively small object information content, the next charge storage time can be controlled by the exposure determined by the threshold value L2, so that the accurate object information content can be obtained and the photoelectric conversion outputs for focus detection do not fall outside the input range of the A/D converter. The same effect as in the fourth embodiment is obtained by the fifth embodiment.

The exposure detecting means 85 may utilize an output from a photometer means of a camera. As shown in FIG. 14A of the fifth embodiment, in the first charge-storage time control scheme, when a sufficiently high object information content E is provided, the next charge storage time Ts(n+1) can be set to be equal to the previous charge storage time Ts(n) in step 156 (FIG. 10). Similarly, in the second charge-storage time control scheme, when the object information content E is considerably small, i.e., when the time Ts(n+1) is longer than the time T2, the next charge storage time Ts(n+1) can be set to be equal to the previous charge storage time Ts(n) in step 156. In both cases, since focus control may be adversely affected in accordance with variations in object luminance, photoelectric conversion can be stopped when the charge storage level reaches a predetermined level so as to perform the same focus detection control as described above.

The present invention is not limited to the optical system shown in FIG. 3, and an optical system shown in U.S. Pat. No. 4,156,563 may be used. Since the focus detection apparatus is of a correlation coefficient interpolation type for detecting a deviation in images, the object information content is given as a maximum value among the absolute values representing the differences between the correlation coefficients. However, in a self-correlation type focus detection apparatus as described in U.S. Pat. No. 4,288,152, the object information content I0 may be a maximum value among the absolute values representing the differences between self-correlation coefficients. The maximum value can be represented by a spatial frequency component fn of the object and its magnitude Sn (Sn represents contrast) which are utilized for focus detection:

$$Icomp = \Sigma fn \cdot Sn$$

The sum Icomp can be used to express the maximum value. Alternatively, the object information content I0 can be expressed as a contrast value.

What is claimed is:

1. A focus detection apparatus for a camera including:
   (a) image sensor means for detecting a light intensity distribution on a predetermined surface of two light rays reflected from an object and passing through two different regions of an exit pupil of a photographing lens of the camera and for generating a photoelectric output, said image sensor means being provided with a plurality of charge storage type photoelectric conversion elements;
   (b) object information detecting means for detecting object information which relates to contrast of the object in accordance with the photoelectric output and generating an object information signal, said object information detecting means including correlation calculating means for calculating a correlation between the photoelectric output representing a light intensity distribution of one of the two light rays on said predetermined surface and the photoelectric output representing a light intensity distribution of the other of the two light rays on said predetermined surface; and
   (c) control means for controlling a charge storage time of said plurality of photoelectric elements in response to the object information signal.

2. An apparatus according to claim 1, wherein
said control means generates a control signal representing the charge storage time in response to the object information signal, and
said image sensor means includes driving means for repeatedly driving said plurality of photoelectric elements for the charge storage time represented by the control signal.

3. An apparatus according to claim 2, wherein
said object information detecting means generates the object information signal every time said image sensor means generates the photoelectric output, and
said control means includes time calculating means for calculating the charge storage time every time the object information signal is generated.

4. An apparatus according to claim 3, wherein said time calculating means calculates the charge storage time on the basis of a value representing predetermined object information and a value representing object information represented by the object information signal.

5. An apparatus according to claim 3, wherein said control means includes time storage means and writing means for writing the charge storage time calculated by said time calculating means in said time storage means, said writing means being adapted to update a content of said time storage means to the charge storage time calculated by said time calculating means every time said time calculating means calculates the charge storage time.

6. An apparatus according to claim 5, wherein
said control means includes comparing means for comparing the value of the object information signal with first and second values, the first value being larger than the second value, and
said time calculating means calculates a time longer than the charge storage time written in said time storage means in response to said comparing means when the value represented by the object information signal is larger than the first value, and a time shorter than the charge storage time written in said time storage means in response to said comparing means when the value represented by the object information signal is smaller than the second value.

7. An apparatus according to claim 6, wherein said control means controls the charge storage time of said plurality of photoelectric conversion elements to the time calculated by said time calculating means when the value represented by the object information signal is larger than the first value or smaller than the second value.

8. An apparatus according to claim 6, wherein said control means controls said plurality of photoelectric conversion elements in accordance with the charge storage time stored in said time storage means when the value represented by the object information signal falls within a range between the first and second values.

9. An apparatus for performing focus detection in response to an output from image sensor means having a plurality of charge storage type photoelectric conversion elements, including:
 (a) object information detecting means for detecting object information, relative to contrast of an object and generating an object information signal; and
 (b) control means for controlling a charge storage time of said plurality of photoelectric conversion elements in accordance with the object information signal.

10. An apparatus according to claim 9, wherein said object information detecting means includes means for calculating the object information in accordance with the output from said image sensor means.

11. An apparatus according to claim 9, wherein said object information detecting means includes correlation signal generating means for generating a correlation signal in response to an output from said image sensor means and calculating means for calculating the object information in accordance with the correlation signal.

12. An apparatus according to claim 11, wherein said control means controls the charge storage time of said plurality of photoelectric conversion elements in accordance with a value representing predetermined object information and a value representing the object information calculated by said calculating means.

13. An apparatus according to claim 9, which further comprises another object information means for detecting object information relative to an intensity of light from the object and generating another object information signal, and wherein said control means controls the charge storage time of said plurality of photoelectric conversion elements in response to said another object information signal irrespective of the first-mentioned object information signal.

14. An apparatus according to claim 13, wherein said another object information means produces said another object information signal in response to a total of charges stored by at least a part of siad plurality of photoelectric conversion elements.

15. An apparatus according to claim 14, wherein said anotehr object information means detects that the total of charges stored by at least said part of said plurality of photoelectric conversion elements exceeds a predetermined value during the charge storage time.

16. An apparatus according to claim 9, which further comprises another object information means for detecting object information relative to an intensity of light from the object and generating another object information signal, and wherein said control means includes determining means for determining the charge storage time of said plurality of photoelectric conversion elements and means for causing said determining means to determine the charge storage time on the basis of one of the first-mentioned object information signal and said another object information signal.

17. An apparatus according to claim 16, wherein said antoher object information means produces said another object information signal on the basis of a total of charges stored by at least a part of said plurality of photoelectric conversion elements.

18. An apparatus according to claim 17, wherein said control means controls said photoelectric conversion elements in response to the charge storage time determined by said determining means.

19. An apparatus for performing focus detection in response to an output from image sensor means having a plurality of charge storage type photoelectric conversion elements, including:
 (a) determining means for determining a charge storage time of said plurality of photoelectric conversion elements;
 (b) memory means;
 (c) first updating means for updating a content of said memory means to the charge storage time determined by said determining means, said determining means being adapted to determine the charge storage time in accordance with the content of said memory means every time said image sensor generates the output;
 (d) detecting means for detecting that a total of charges stored by at least some of said plurality of photoelectric conversion elements exceeds a predetermined value during a charge storage time of said plurality of photoelectric conversion elements;
 (e) second updating means for updating the content of said memory means to the charge storage time required for the total of charges of said at least some of said plurality of photoelectric conversion elements to exceed the predetermined value; and
 (f) control means for controlling the charge storage time of said plurality of photoelectric conversion elements in accordance with the content of said memory means.

20. An apparatus according to claim 19, wherein said determining means comprises object information detecting means for detecting object information which relates to contrast of said object and means for calculating the charge storage time on the basis of said object information.

21. An apparatus according to claim 20, which further comprises means for causing said plurality of photoelectric conversion elements to store charges repeatedly.

22. An apparatus according to claim 21, wherein said detecting means detects that said total of charges stored by at least said part of said plurality of photoelectric conversion elements exceeds said predetermined value and thereby produces a detection signal, and wherein said second updating means updates the content of said memory means in response to said detection signal.

23. An apparatus for performing focus detection in response to an output from image sensor means having a plurality of charge storage type photoelectric conversion elements, including:

(a) means for causing said plurality of charge storage type photoelectric conversion elements to start storing charges repeatedly;
(b) memory means;
(c) timer means for commencing measurement of time in response to a start of a charge storage of said plurality of photoelectric conversion elements and for completing said measurement at a time dependent upon the content of said memory means;
(d) first updating means for determining the charge storage time of said plurality of photoelectric conversion elements and for updating the content of said memory means to correspond to the determined charge storage time;
(e) means for detecting that a total of charges stored by at least a part of said plurality of photoelectric conversion elements exceeds a predetermined value during the charge storage time and thereafter producing a charge detection signal;
(f) second updating means responsive to said charge detection signal for updating the content of said memory means to correspond to a time measured by said timer means when said charge detection signal is produced, irrespective of said first updating means; and
(g) control means responsive to the content of said memory means for controlling said image sensor means to adjust the charge storage time of said plurality of photoelectric conversion elements.

24. An apparatus according to claim 23, wherein said control means controls said image sensor means so that the storage time of said plurality of photoelectric conversion elements corresponds to the content of said memory means.

25. An apparatus according to claim 23, wherein said first updating means determines the charge storage time in accordance with the content of said memory means every time said image sensor means generates the output.

26. An apparatus according to claim 23, wherein said first updating means comprises object information detecting means for detecting object information which relates to contrast of said object and thereafter producing an information signal.

27. An apparatus according to claim 26, wherein said plurality of photoelectric conversion elements form two arrays, said object information detecting means comprises means for calculating an amount of correlation between the outputs of said two arrays and means for producing said information signal.

28. An apparatus according to claim 27, wherein said object information detecting means comprises means for comparing said amount with a predetermined value and means for comparing said amount with another predetermined value.

29. An apparatus according to claim 27, wherein said first updating means comprises means for calculating the charge storage time on the basis of said amount.

30. An apparatus according to claim 23, which further comprises means for detecting that the output of said image sensor means is outside of a predetermined range.

31. An apparatus for performing focus detection in response to an output from image sensor means including two element groups each of which has a plurality of charge storage type photoelectric conversion elements, including:
(a) object information detecting means responsive to outputs of said two element groups for detecting object information which relates to contrast of said object and thereafter producing an information signal; and
(b) control means responsive to said information signal for controlling said image sensor means to adjust the storage time of said plurality of photoelectric conversion elements of said two element groups.

32. An apparatus according to claim 31, wherein said object information detecting means comprises correlation means for detecting correlation between outputs of said two element groups and producing a correlation signal as said information signal.

33. An apparatus according to claim 31, wherein said control means comprises comparision means for comparing said information signal with a predetermined level and producing a comparison signal.

34. An apparatus according to claim 33, wherein said control means comprises calculating means for calculating the storage time of said plurality of photoelectric conversion elements on the basis of said comparision signal and said information signal.

35. An apparatus according to claim 34, wherein said control means comprises another comparison means for comparing said information signal with another predetermined level which is lower than said predetermined level and producing another comparison signal, said calculating means calculating the storage time of said plurality of photoelectric conversion elements on the basis of said another comparison signal and said information signal.

* * * * *